(12) United States Patent
Stanton et al.

(10) Patent No.: US 6,196,761 B1
(45) Date of Patent: *Mar. 6, 2001

(54) UNDERGROUND STORAGE VAULT

(75) Inventors: Kelly Stanton, Schenectady, NY (US); Laura Misiewicz-DelZotto, Ocala, FL (US)

(73) Assignee: Guardian Containment Corp., Schnectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/211,023

(22) Filed: Dec. 14, 1998

Related U.S. Application Data

(63) Continuation-in-part of application No. 09/132,418, filed on Aug. 11, 1998.

(51) Int. Cl.$^7$ .................................................. B65G 5/00
(52) U.S. Cl. ...................... 405/53; 220/567.2; 137/312
(58) Field of Search ................ 141/86, 98; 220/567.1, 220/567.2; 137/312, 364, 342; 405/52, 53, 54, 55, 57

(56) References Cited

U.S. PATENT DOCUMENTS

| | | | |
|---|---|---|---|
| 1,958,487 | * | 5/1934 | Moran . |
| 2,083,491 | * | 6/1937 | Chaffee . |
| 2,136,390 | * | 11/1938 | McHugh . |
| 2,544,828 | * | 3/1951 | Dobell . |
| 2,777,295 | * | 1/1957 | Bliss et al. . |
| 3,151,416 | * | 10/1964 | Eakin et al. . |
| 3,562,977 | * | 2/1971 | Alleaume . |
| 3,995,472 | * | 12/1976 | Murray . |
| 4,183,221 | * | 1/1980 | Yamamoto . |
| 4,366,654 | * | 1/1983 | Bomhard . |
| 4,372,906 | * | 2/1983 | Del Valle . |
| 4,513,550 | * | 4/1985 | Kotcharian . |
| 4,552,166 | * | 11/1985 | Chadbourne, Sr. et al. . |
| 4,607,522 | * | 8/1986 | Sharp . |
| 4,653,312 | * | 3/1987 | Sharp . |
| 4,682,911 | * | 7/1987 | Moreland ............................ 405/53 |
| 4,826,644 | * | 5/1989 | Lindquist . |
| 4,895,272 | * | 1/1990 | De Benedittis et al. . |
| 4,911,326 | * | 3/1990 | McGouran, Jr. . |
| 4,934,122 | * | 6/1990 | Linquist . |
| 4,934,866 | * | 6/1990 | Gage ................................... 405/54 |
| 4,978,249 | * | 12/1990 | Killman .............................. 405/54 |
| 4,986,436 | * | 1/1991 | Bambacigno et al. . |
| 4,989,750 | * | 2/1991 | McGarvey ...................... 220/567.2 |
| 5,030,033 | * | 7/1991 | Heintzelman et al. ............. 405/53 |
| 5,197,627 | * | 3/1993 | Disabato . |
| 5,284,191 | * | 2/1994 | McGarvey ....................... 137/312 |

(List continued on next page.)

*Primary Examiner*—Eileen D. Lillis
*Assistant Examiner*—Frederick L. Lagman
(74) *Attorney, Agent, or Firm*—D. L. Tschida

(57) ABSTRACT

A double-walled, below-grade, modular, liquid containment vault that contains one or more primary storage tanks. Dispensing pumps and sundry conduits and support equipment are attached to or supported to a cover or top wall of the vault. The outer shell or base and primary tanks of the vaults can be constructed from concrete, steel, fiberglass or other composites. In concrete and steel vaults, the cover is secured to the primary tanks. The cover can also be bound to the walls of the outer shell. The pumps can be coupled to a remote control and communications kiosk. A manhole turret provides access to a ventilated secondary containment and inspection space within a base unit. Spill and overflow containment turret assemblies surround fill and vent pipes in the cover and direct spillage to the secondary storage space. Tertiary and auxiliary containment is also provided for spillage from the dispensing pumps and backup storage for the overflow containment assemblies. Additional standpipes communicate with the secondary containment and inspection space and support additional monitoring and inspection equipment.

8 Claims, 11 Drawing Sheets

U.S. PATENT DOCUMENTS

| | | | |
|---|---|---|---|
| 5,346,093 | * | 9/1994 | De Benedittis et al. . |
| 5,381,923 | * | 1/1995 | O'Dea . |
| 5,454,205 | * | 10/1995 | Bol .......................................... 405/53 |
| 5,495,695 | * | 3/1996 | Elliott, Jr. ............................... 405/53 |
| 5,582,310 | * | 12/1996 | DelZotto . |
| 5,769,109 | * | 6/1998 | Stanton et al. ........................ 137/312 |
| 5,778,608 | * | 7/1998 | Elliott, Jr. .............................. 405/53 |
| 5,865,346 | * | 2/1999 | Del Zotto ............................. 137/312 |
| 5,881,760 | * | 3/1999 | Del Zotto ............................. 137/312 |

* cited by examiner

UNDERGROUND STORAGE VAULT

RELATED APPLICATIONS

This is a continuation-in-part application of Ser. No. 09/132,418, filed Aug. 11, 1998.

BACKGROUND OF THE INVENTION

The present invention relates to fuel storage vaults and, in particular, to a ventilated, below-grade, containment vault that contains one or more primary, liquid storage tanks. A manhole permits access to the vault and spill and overflow containment assemblies direct spillage and vent overflow to the primary, secondary or tertiary storage spaces. Dispensing pumps are secured to a top wall containing sundry conduits, accessory fixtures and support equipment.

A byproduct of society's increasing awareness to the environment and growing concerns toward ground water contamination and the adverse effects of spilled petrochemicals (e.g. oil, gasoline etc.) has been the institution of varieties of regulatory controls over related storage vessels. The controls are intended to promote safe fuel storage and contain spills. A primary goal is to avoid contaminated soils, such as commonly found at the sites of gasoline stations, fueling depots and other fuel handling sites. The contamination can insidiously occur over time from small leaks or from a single large spill.

The fuel delivery industry has a separate desire for automatic, attendant free dispensing stations. The station should be compatible with all regulatory requirements and permit fuel delivery with either cash or credit card. Appurtenant storage tanks may either mount above or below grade and controls should be available to make the tanks substantially self-sufficient.

A variety of below-grade storage containers have been developed for containing pressurized and non-pressurized, flammable liquids, such as gasoline, propane or natural gas. Some of these containment vessels and tanks are shown at U.S. Pat. Nos. 1,958,487; 3,151,416; 3,995,472; 4,183,221; 4,607,522; and 4,653,312. The foregoing containers generally provide assemblies that include a primary, metal containment chamber that is surrounded by a reinforcing material, such as concrete. Various arrangements of intervening layers of insulators and/or liquid impermeable materials are also included in the various tank assemblies.

Numerous above-grade storage vessels are also known. Most of these vessels provide only a tank assembly having a single skin or single layer of material, such as metal or concrete. Rupture or damage to the tank wall most typically results in an uncontrolled and unconfined spill. To avoid unconfined spills, some tanks are mounted behind a surrounding berm wall or dike.

In lieu of a dike, some tanks are constructed with a multi-layered construction that includes a primary tank surrounded by a concrete or metal structure. The primary tank may be integrated into the surrounding structure. U.S. Pat. Nos. 2,083,491; 2,136,390; 2,777,295; and 4,513,550 disclose cast concrete containment chambers wherein the structural walls include liquid impermeable liners.

Still other above-grade storage vessels are disclosed at U.S. Pat. Nos. 2,544,828; 3,562,977; 4,366,654; 4,372,906; 4,552,166; 4,826,644; 4,911,326; 4,934,122; and 4,986,436. Some of the foregoing storage tanks provide a primary, metal containment chamber that is surrounded by a monolithic cast concrete vault. One or more intervening membranes, impermeable to a contained liquid, are also provided to obtain secondary containment.

Another metal storage vessel having secondary containment is shown at U.S. Pat. No. 4,895,272. Also included in this tank is an assembly for directing spillage from the vent into a secondary storage space. U.S. Pat. No. 5,769,109 discloses a spill containment collar to direct spillage into the primary tank and/or a secondary storage space. Other above-grade, metal storage tanks of double wall construction or having spill containment capabilities are shown at U.S. Pat. Nos. 5,197,627; 5,346,093; and 5,381,923.

A principal deficiency of above-grade storage tanks is that the primary tank is exposed to physical dangers that can effect the life of the container. Surface mount tanks are particularly subject to i) potential cracking of concrete portions with thermal expansion and contraction; ii) rust or corrosion of metal components; iii) potential corrosion of reinforcement members within concrete portions; and iv) physical damage due to handling or collision from automobiles, trucks, on-site equipment or the like. Damage to any one of the container components can require replacement of the entire assembly.

Below-grade vaults can also suffer from problems of corrosion or cracking. Available double walled tanks, however, do not permit internal inspection or maintenance. The vault interiors are instead monitored with monitoring equipment of various types.

The below-grade containment vaults of the invention were developed to accommodate all enacted regulations, especially applications requiring storage of gasoline and petrochemicals. Another purpose was to accommodate user concerns to cost and repair or replacement of portions of the vault. Another was to provide a vault that is useable at fuel dispensing stations and depots. The vaults also include covered manholes and internal free space adjacent the primary tank(s) to facilitate internal inspection and maintenance.

One version of the vault is constructed in the form of a pre-cast concrete housing that contains one or more internal storage tanks. A base and cover are constructed to accommodate burial and support one or more liquid dispensers on the cover. A modular construction permits selective replacement of container components. A modular, construction also accommodates conventional pre-cast manufacturing processes and transport of the relatively heavy vault components.

Another double walled vault is constructed from steel. The steel vault is constructed to accommodate the same accessories. The primary tank(s) mounted within the vault can be constructed from steel, fiberglass or other appropriate materials. Manhole access and spill and rupture containment provisions are also provided at each vault.

SUMMARY OF THE INVENTION

It accordingly is a primary object of the invention to provide an environmentally friendly liquid containment vessel that can be mounted above or below-grade.

It is a further object of the invention to provide a vault having a reinforced cast concrete base and a detachable cast concrete cover.

It is a further object of the invention to provide a vault having one or more primary, liquid storage tanks that are secured to the cover and sufficient secondary and/or tertiary space to collect spills.

It is a further object of the invention to provide a vault having a manhole access port and a ventilated interior that is sized to permit internal examination and maintenance of the primary tank(s).

It is a further object of the invention to provide a cast concrete vault and cover that includes sundry conduits, fixtures, dispensing pumps and accessories coupled to one or more primary storage tanks.

It is a further object of the invention to provide a double walled containment vault having a steel outer vault and one or more steel, fiberglass or composite primary tanks.

It is a further object of the invention to provide a sump and one or more siphon assemblies that communicate with the vault interior to facilitate removal of condensation and the recovery of leaked or spilled liquids.

It is a further object of the invention to provide a raised, spill and overflow containment collar that surrounds fill, dispensing and/or vent pipes and that is coupled to direct liquids to the primary, secondary and/or auxiliary or tertiary storage spaces.

Various of the foregoing objects, advantages and distinctions of the invention are obtained in one presently preferred cast concrete vault that provides an open-topped, reinforced base and a separately cast, detachable cover. The cover includes a number of permanently mounted conduits, junction boxes and support platforms for one or more liquid dispensing pumps. A manhole access port is provided that opens to the interior of the base. The cover is cast to support the weight of covering earth and vehicles that may pass over the cover.

Another vault is constructed from steel. One or more primary tanks are mounted in an outer steel vault that serves substantially the same function as the concrete base. A covered manhole opens to an inspection space in the vault interior.

A spill containment turret or collar surrounds fill, dispensing and/or vent standpipes to collect spillage that can occur during filling or with liquid expansion. The spill containment turret can align to a liquid dispenser support platform. Conduits direct collected spillage to the primary and/or secondary containment space within the base or outer vault or to an auxiliary collection tank. Other standpipes permit monitoring the stored liquid and inspection of the secondary and tertiary containment spaces. The various standpipes can be incorporated into guard stanchions mounted about the dispensing pumps.

The base or outer vault, which are synonymous below, supports one or more primary, liquid storage tanks that are formed of steel, fiberglass or other composite materials. The base and cover can be lined with a thermal insulator. A sump region at a low point of the base and a siphon assembly are provided. The siphon assembly removes condensation, leakage or spillage. A liquid and vapor tight seal mounts between the base and cover. Separate resilient seals are cast into the cover or fitted to surround the various standpipes.

Air ventilation equipment and/or supply and exhaust ports are provided in the base and cover as necessary to facilitate internal inspection, maintenance and spill collection. Fans circulate and discharge air from the base during inspection.

Still other objects, advantages and distinctions of the invention will become more apparent upon reference to the following detailed description with respect to the appended drawings. Similar components and assemblies shown at the various drawings are referred to with similar alphanumeric reference characters. To the extent various modifications and improvements have been considered, they are described as appropriate.

DESCRIPTION OF THE PREFERRED EMBODIMENTS

Figure 1:
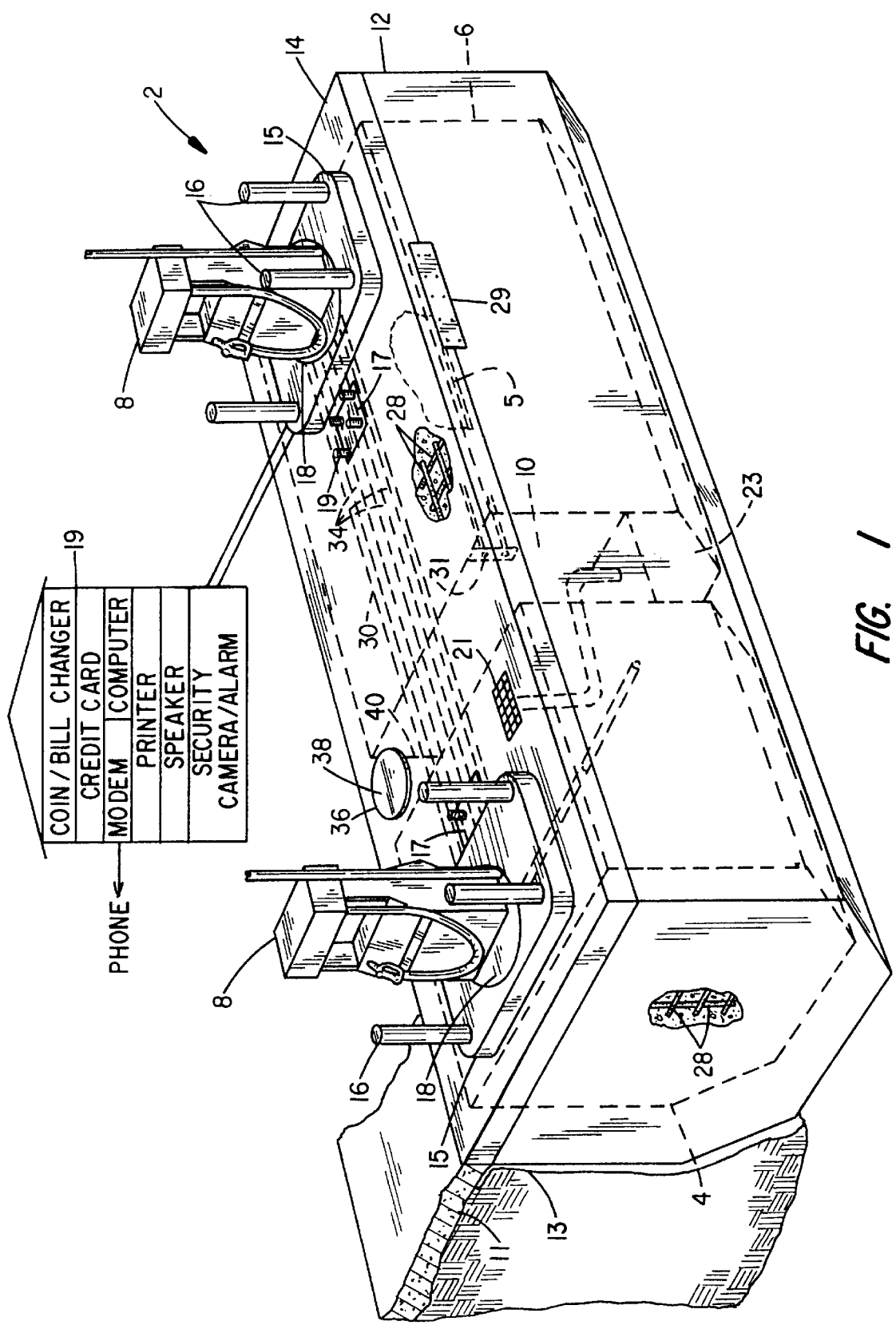
FIG. 1 is a perspective drawing to a ventilated vault mounted in a below grade setting which supports two primary liquid storage tanks of differing sizes and two pump dispensers that communicate with a control kiosk.

Referring to FIG. 1, a perspective drawing is shown to a multi-section, liquid storage container or vault 2. The vault 2 contains a pair of primary, liquid containment tanks 4 and 6 and supports a pair of dispensing pumps 8. The size of the tanks 4 and 6 can be the same or different and can be constructed to various shapes, for example, cylindrical, square, rectangular or various compound shapes. The shape should be sufficient to support the stresses and accommodate an outer container.

Secondary containment of leaks, spills or condensation is obtained at a cavity space 10 within a cast concrete base 12 that surrounds the tanks 4 and 6. The pumps 8 are secured to a detachable cover 14. Each pump 8 is secured to a concrete support pad 15 that is surrounded by a number of vertical stanchions 16. The stanchions 16 principally protect the pumps 8, although can contain standpipes or ports 44 that communicate with the tanks 4 and 6 or interior of the vault 2, such as for venting, inspecting and or monitoring the vault 2. The pads 15 can be cast with the cover 14 or can be mounted to a containment collar 18 and/or mounting plate 60, reference FIG. 3, associated with each pump 8. Anchor plates or supports 17 with fasteners 19 for an awning or other conventional weather cover (not shown) can also be mounted to the cover 14 to span one or multiple vaults 2 and shelter users and their vehicles. The latter mounting is desirable when the vaults are used in a filling station setting.

The vault 2 is constructed to mount below-grade, although could be mounted above-grade. Most typically, the vault 2 is buried to a defined grade in a prepared soil. The exterior of the vault 2 is covered with a suitable sealant such as an epoxy or paint. A liquid impermeable liner 13 can be included in the burial hole prior to setting the vault 2. A cover material 11, such as asphalt, gravel or concrete, is deposited over the soil. The material 11 can abut the cover 14 or a skim coat of suitable thickness can partially overly the cover 14.

The primary storage tanks 4 and 6 can be constructed of metal or fiberglass or other composites. The capacity of the tanks 4 and 6 can be sized as desired. Typically the tanks 4 and 6 are selected and sized to contain different grades of fuel. With the selection of a particular blend of fuel at a pump 8, associated mixing equipment mounted within the pump 8 or vault 2 draws and dispenses appropriate concentrations of the selected liquid.

The vault 2 finds particular application in the setting of a gasoline pumping or service station. With relatively little site preparation, the vault 2 can be set below grade, plumbed and wired to provide an attendant free dispensing facility. In such an instance, a weatherproof, on site shelter or kiosk 19 typically contains appurtenant control and communication equipment regarding user selections and payment. For example, the kiosk 19 might contain, coin and bill accepting and change making equipment, credit card verification equipment, phone lines, modems, a programmed computer, printer, speakers and site security equipment. The foregoing controls might also be divided amongst multiple kiosks 19 and/or portions of the control may be provided directly at the pumps 8, such as credit card readers. The vault 2 may also be used in a conventional service and/or fuel station setting where an attendant is present to facilitate fuel delivery and payment. Data collected by the pumps is coupled to the kiosk 19 and communicated over associated telephone lines to remote locations that monitor usage and available fuel, coordinate re-filling and billing.

Depending upon the size of the tanks 4 and 6, the vault 2 can span the width (i.e. 24–30 feet) between two conventional fuel islands. Alternatively, the vault 2 might define a single island with opposite side drive up. In either instance, the cover 14 is sized to support the load bearing weight. The cover thickness can vary in a range of 6 to 10 inches, depending whether vehicles and/or traffic moves over the cover 14.

A limitation of the practical size of the vault 2 is the weight and ability to transport the base 12, cover 14 and tanks 4 and 6 to a site. The components can be shipped separate for large vaults 2. The cover 14 may also be cast in place to the base 12 at the site. In this instance, a metal plate or support structure 5 (shown in dashed line) or a casting form assembly can be fit to the open edges of the base 12. Concrete can be cast in place over the plate 5. The plate 5 can be incorporated into the cover 14 with reinforcement members 28 and attachment plates 31 or be removed, if lifting hooks are provided.

The base 12 is typically sized to contain a volume of approximately 120% to 150% of the aggregate capacity of the primary tanks 4 and 6. Presently, the base 12 is sized to contain 125% of the storage capacity of the primary tanks 4 and 6. The vault 2 can be sized as desired but typically might contain aggregate volumes of 5,000 to 25,000 gallons. The secondary storage space 10 collects and contains leakage that can occur from a rupture of the primary tanks 4 and 6, condensation that collects on the tanks 4 and 6 or spillage that occurs when filling the tanks 4 and 6 or liquid expansion tlrough the vent lines. Guttering or above-grade spill collection grates 21 can also be provided in or adjacent to the cover 14 and the pumps 8 to direct spillage from customer usage into an auxiliary container 23.

The tank 23 can be supported in the vault 2 or be displaced from the vault 2 at a suitable location. In either instance, necessary piping is provided in conventional fashion. The tank 23 is sized to achieve a desired auxiliary containment. The auxiliary tank 23 can also be coupled with appropriate conduits to the spill containment collars 18 and secondary space 10 to collect spills. Any spillage can thereby be reclaimed without undue effort.

Spillage, which results from over filling the tanks 4 and 6 or from expansion of stored fuel, is normally collected and contained by the tanks 4 and 6 in the secondary space 10. A pair of spill collar or turret assemblies 18 that are discussed in more detail at FIGS. 2, 2A and 3, directs spillage to the space 10. Spill containment is possible due to the excess capacity provided by the base 12. The secondary space 10 is defined by coating the interior walls of the base 12 with a liquid sealant 25 and/or by mounting a liquid impermeable sheathing or membrane 27 between the tanks 4 and 6 and the base 12.

Figure 2:
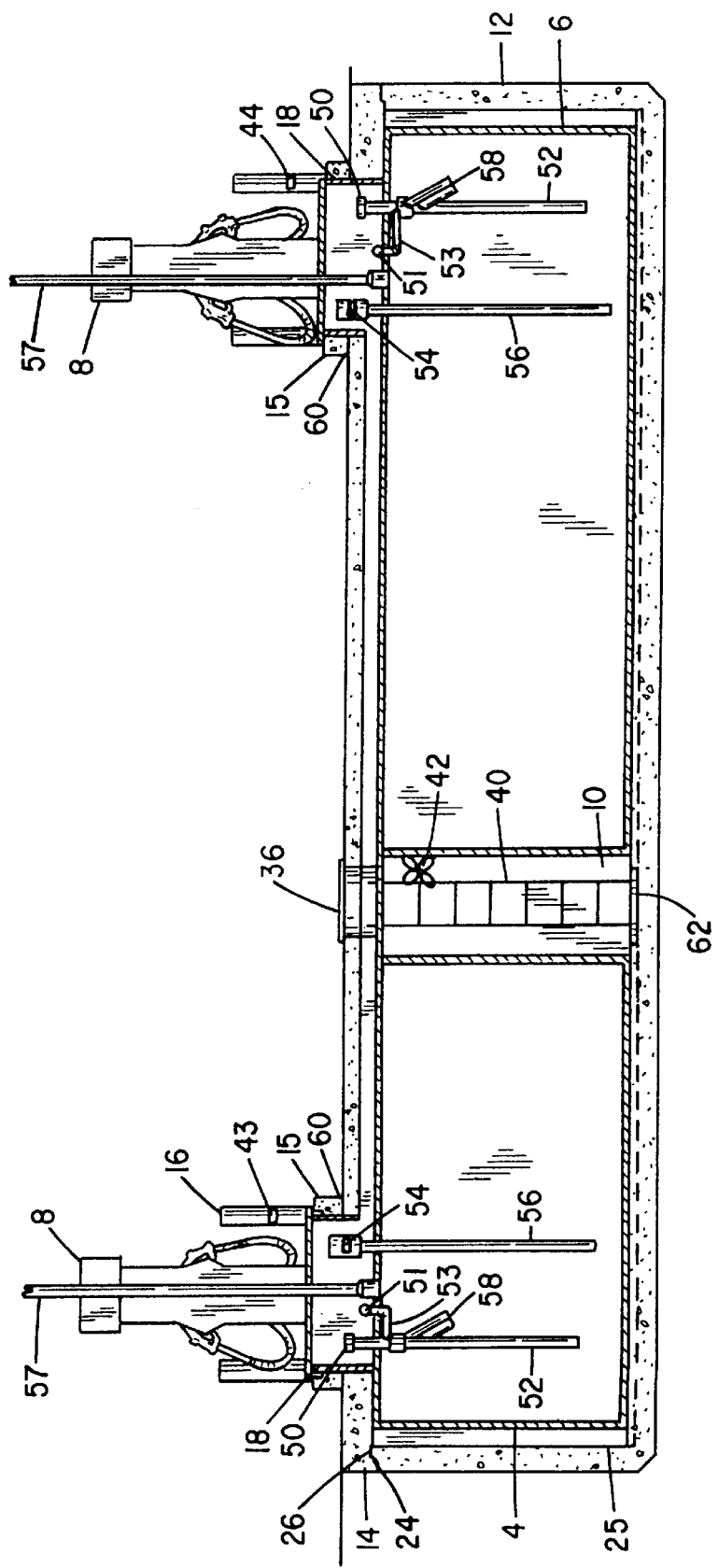
FIG. 2 is a longitudinal cross section view of FIG. 1.
Figure 2A:
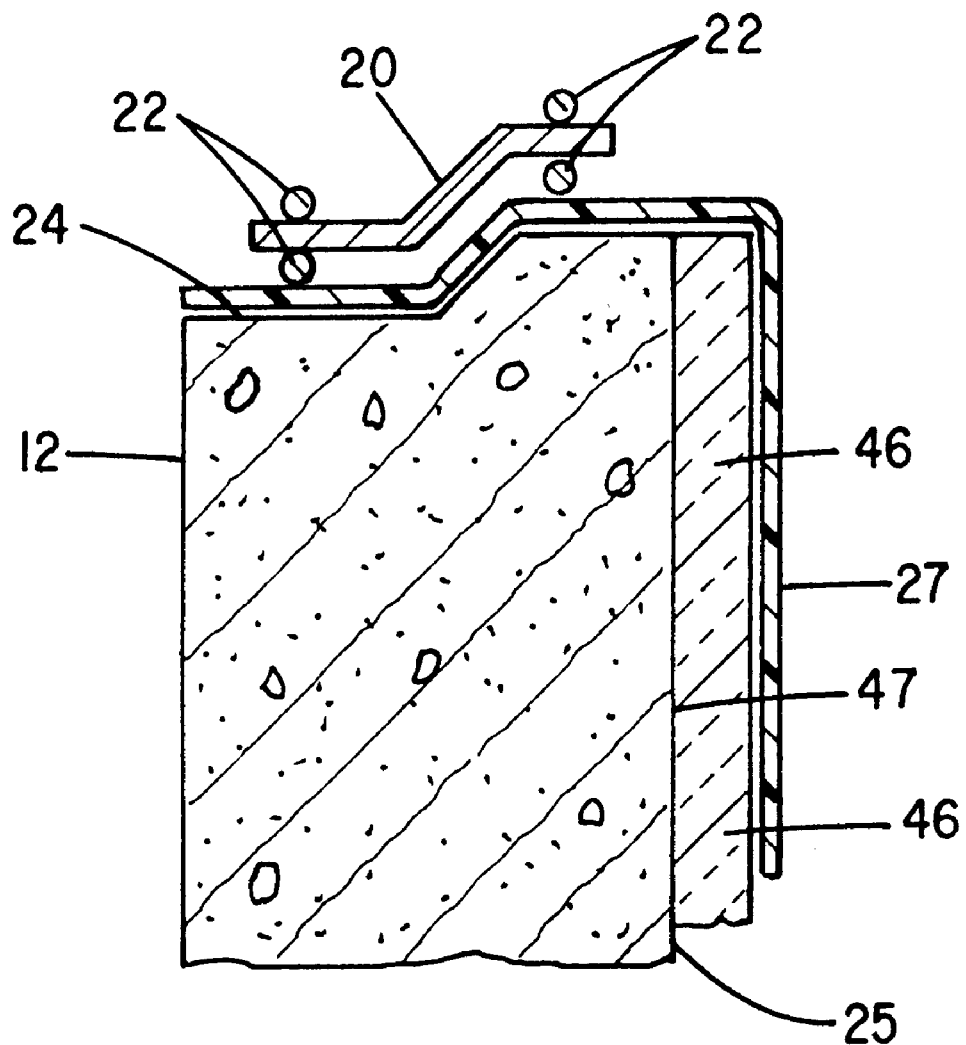
FIG. 2a is a detail drawing to the seam between the cover and base.

With attention to FIG. 2A, the cover 14 is sealed to the upper peripheral edge of the base 12 with a resilient, compressible, fire stop or barrier material 20. Beads of sealant 22 are applied to the barrier 20. Staggered, mating flanged surfaces 24 and 26 are formed into the base 12 and cover 14 to overlap and align with one another and interlock the cover 14 to the base 12. The integrity of the vault 2 is thereby preserved against lateral forces directed against the base 8 and cover 14, such as from frost and heaving at the fill earth. Strips of steel or plates 29 can also be secured to the cover 14 and base 12 to further protect the seam between the cover 14 and base 12. A liquid and vapor tight seal is thereby obtained.

The interior surfaces of the vault 2 can be lined with a thermal insulator or liner 46. Sheets of foam can be used to this end. When used, the foam is bonded with a suitable adhesive to the concrete walls and floor of the base 12 and to the cover 14. The thermal, insulation barrier reduces potential moisture and condensation that can occur within the vault 2.

If a foam liner 46 is applied, a separate layer of a liquid impermeable sheathing 27 is normally mounted to cover the thermal barrier 46. The sheathing 27 is folded to closely fit to the foam liner 46, wrap over the upper edge 24 and mount beneath the fire stop 20. The sheathing 27 is bonded to the liner 46 with the adhesive sealant 22 (e.g. PENSIL 300). The interior walls of the base 12 can be separately coated with a commercially available sealant. The sheathing 27 defines a tertiary containment space 47 in the space between the sheathing 27 and walls of the base 12.

Cast into the walls of the base 12 and cover 14 in conventional fashion are reinforcement members 28. The members 28 typically comprise lengths of rebar, wire mesh or the like. The reinforcement members 28 at the cover 14 are sized and mounted to withstand the loading of the ground cover and/or vehicles being driven over the vault 2. Steel attachment plates 31 are welded to project above the tanks 4 and 6 and to depend from the cover 14. The plates 31 can be welded to the plate 5, if the cover is cast in place. The reinforcement members 28 are coupled to the plates 31, which are separately fastened to each other with appropriate fasteners at overlapping slip joints or apertures that align to each other. The attachment of the cover 14 to the tanks 4 and 6 can be effected before setting the cover 14 and tanks 4 and 6 into the base 12 and possibly after, depending upon the available internal inspection space. The fastening of the cover 14 to the tanks 4 and 6 further stabilizes the vault 2.

Disposed within the cover 14 are a number of runs of electrical conduit 30 and liquid conduits 34. Appropriate junction boxes or fixtures are provided at the terminations of the conduit 30 and/or pipes 34, such as the pumps 8 or spill collars 18. For example, the conduits 30 and pipes 34 normally contain control wiring and power conductors. Some may direct spillage and overflow between the tanks 4 and 6 and to the secondary storage space 10.

Mounted in the cover 14 between the tanks 4 and 6 is a manhole or access port 36. A locked steel cover 38 is mounted to prevent unauthorized access by vandals. A ladder 40, see also FIG. 2, is positioned below the port 36. The tanks 4 and 6 are mounted to permit entry to the secondary space 10 by maintenance personnel to inspect the interior of the base 12 for damage and the presence of condensation, leakage or spillage. A ventilation fan 42 mounted in the space 10 cooperates with air intake ports 43 and exhaust ports 44. The ports 43 and 44 can be fitted to the stanchions 16 and, an exemplary one of which is shown, or in other locations about the cover 14.

Referring to FIG. 2 and positioned beneath each pump 8 is a spill collar 18. Each collar 18 can be constructed as a metal assembly or can be cast into the cover 14. The collars 18 define a collection space around the fill and/or vent ports and contain possible spillage that might occur during the filling of the tanks 4 and 6 or from back pressure through a tank vent. Spillage from filling can occur under either a "loose fill" or "tight fill" condition. A "loose fill" condition exists when a fill nozzle is loosely supported (i.e. not threaded) to the collar 50 of a fill pipe 52. If liquid collects in the collar 18, it is directed by a screened drain head 51 and pipe 53 back into the pipe 52. If a larger volume spill occurs, the spill is also directed by a screen covered collar 54 of a vent pipe 56 into the tank 4 or 6. Separate vent pipe risers 57 extend above the pumps 8.

A "tight fill" condition exits where the fill nozzle is threaded to the collar 50 and fill pipe 52 and the fuel backs up through the vent collar 54 and vent pipe 56 to collect in the spill collar 18. In this instance, the spill is directed by the drain 51 back into the tank. Separate piping (not shown) may also be directed from each spill collar 18 to the auxiliary tank 23 in the event the capacity of the collar 18 is exceeded. The collars 18 might accommodate 5 to 25 gallons.

A check valve 58 is separately fitted to the fill pipes 52 to prevent back flow from the tanks 4 and 6 through the fill pipe 52. The check valve 58 may or may not be included as required by a particular application. Access to the fill collars 54 is obtained through covers at the mounting plate 60 aligned to each spill collar 18 and pump 8.

Figure 3:
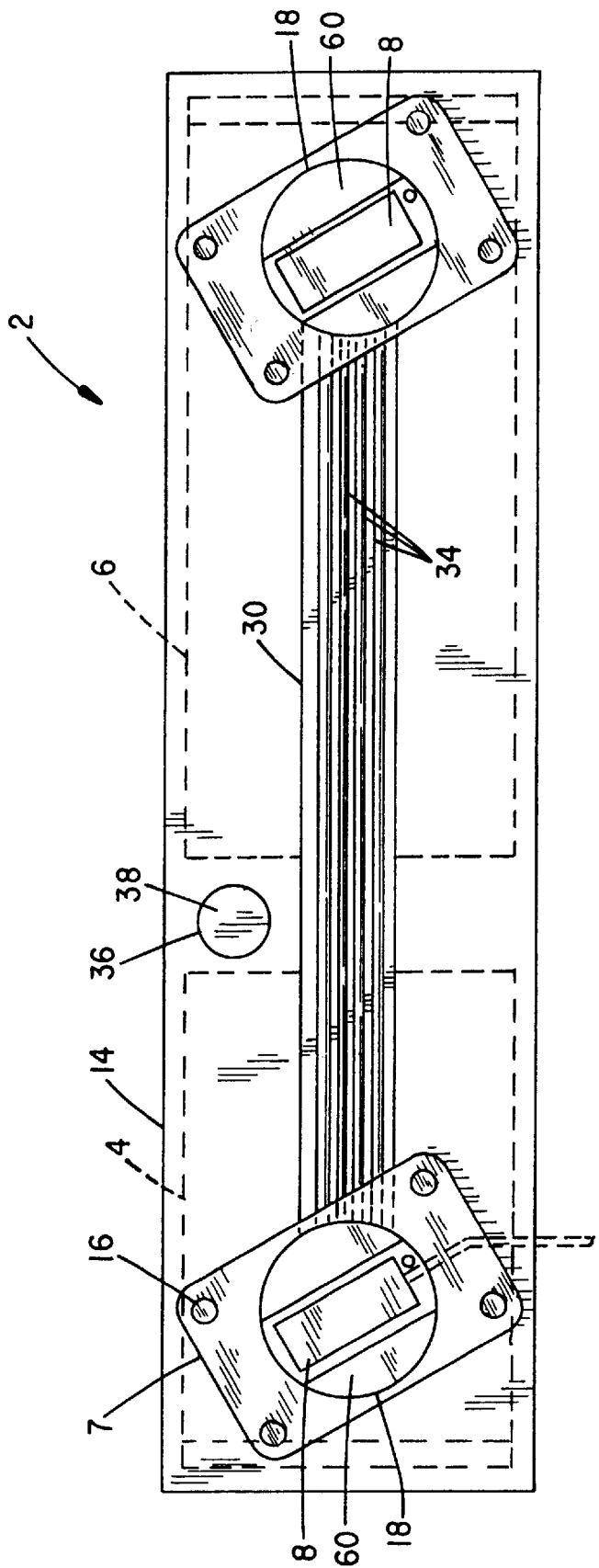
FIG. 3 is a top plan view of the tank cover and dispenser mounting plate.

The orientation of the pumps 8 to the cover can be varied as desired. FIG. 3 depicts a rotated mounting arrangement of the mounting plates 60 that support the concrete support pads 15 and pumps 8.

Also associated with the vault 2 is various leak and spill monitoring equipment. The monitoring equipment is fitted to appropriate standpipes to monitor liquid in the secondary and tertiary spaces 10 and 47. A variety of conventional monitoring assemblies from dipsticks to electronic transducers can be adapted to monitor internal liquid levels. The vault 2 can also be visually inspected via the manhole 36.

A grate covered sump region 62 is also formed in the bottom of the base 12 to collect leakage and spillage. The bottom wall of the base 12 is sloped and/or includes recessed channels (shown in dashed line) to direct the liquid to the low point of the sump 62. A conventional siphon or pump assembly may be fitted in conventional fashion to extract liquids that collect in the spaces 10, 47 and 62.

Figure 4:
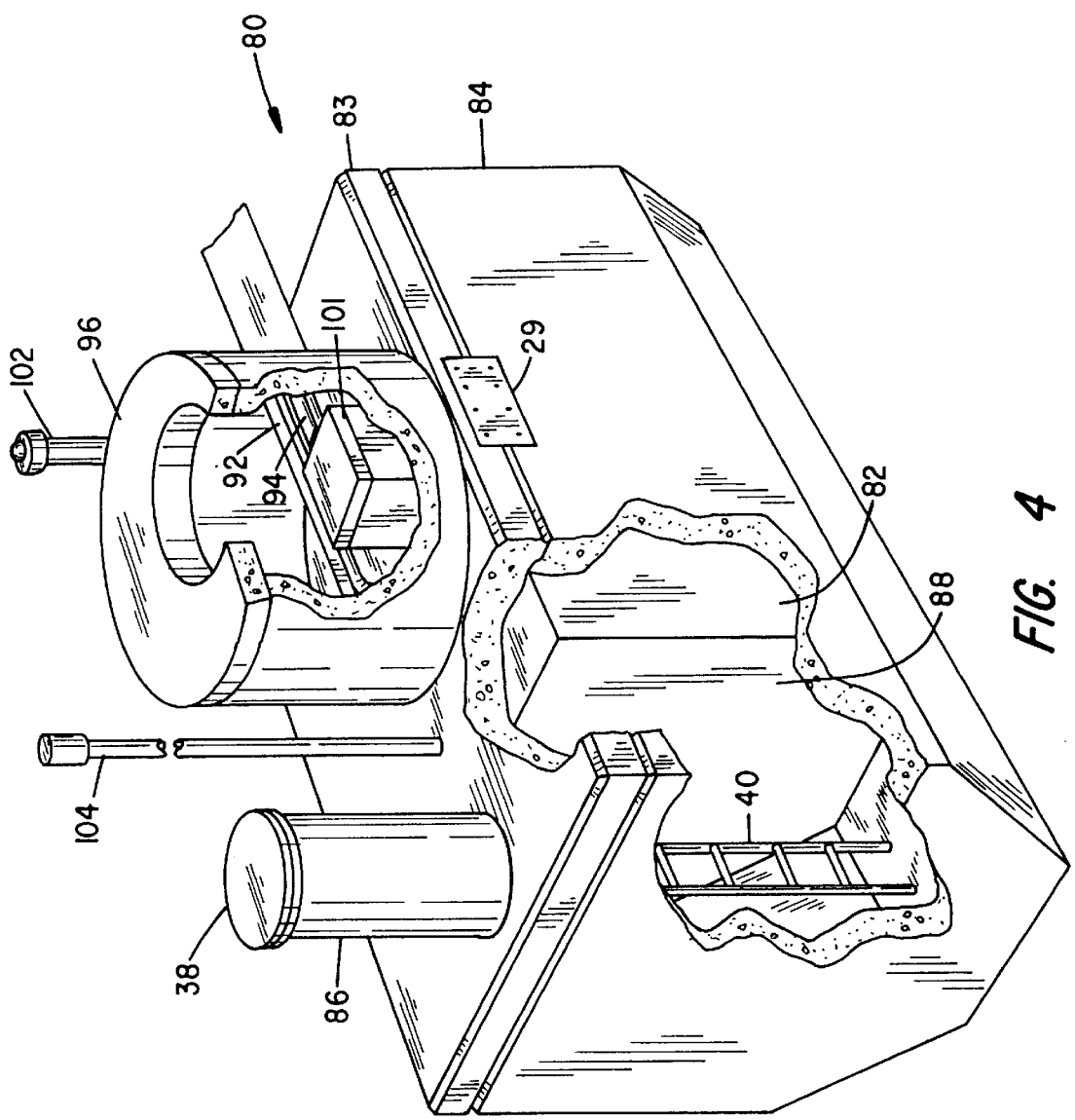
FIG. 4 is a perspective drawing to a ventilated vault that supports a single tank and dispenser.
Figure 5:
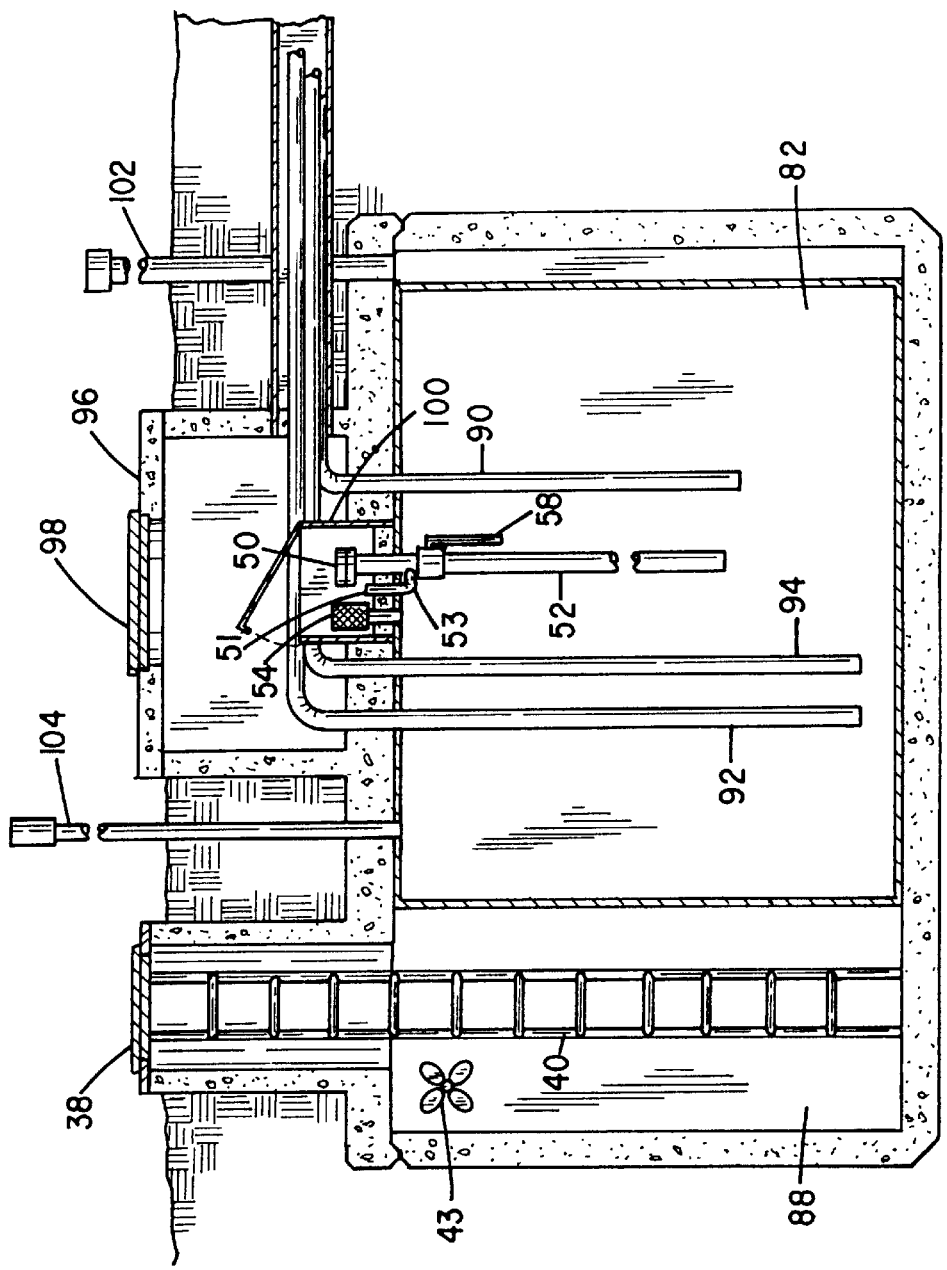
FIG. 5 is a longitudinal cross section view of FIG. 4.
Figure 6:
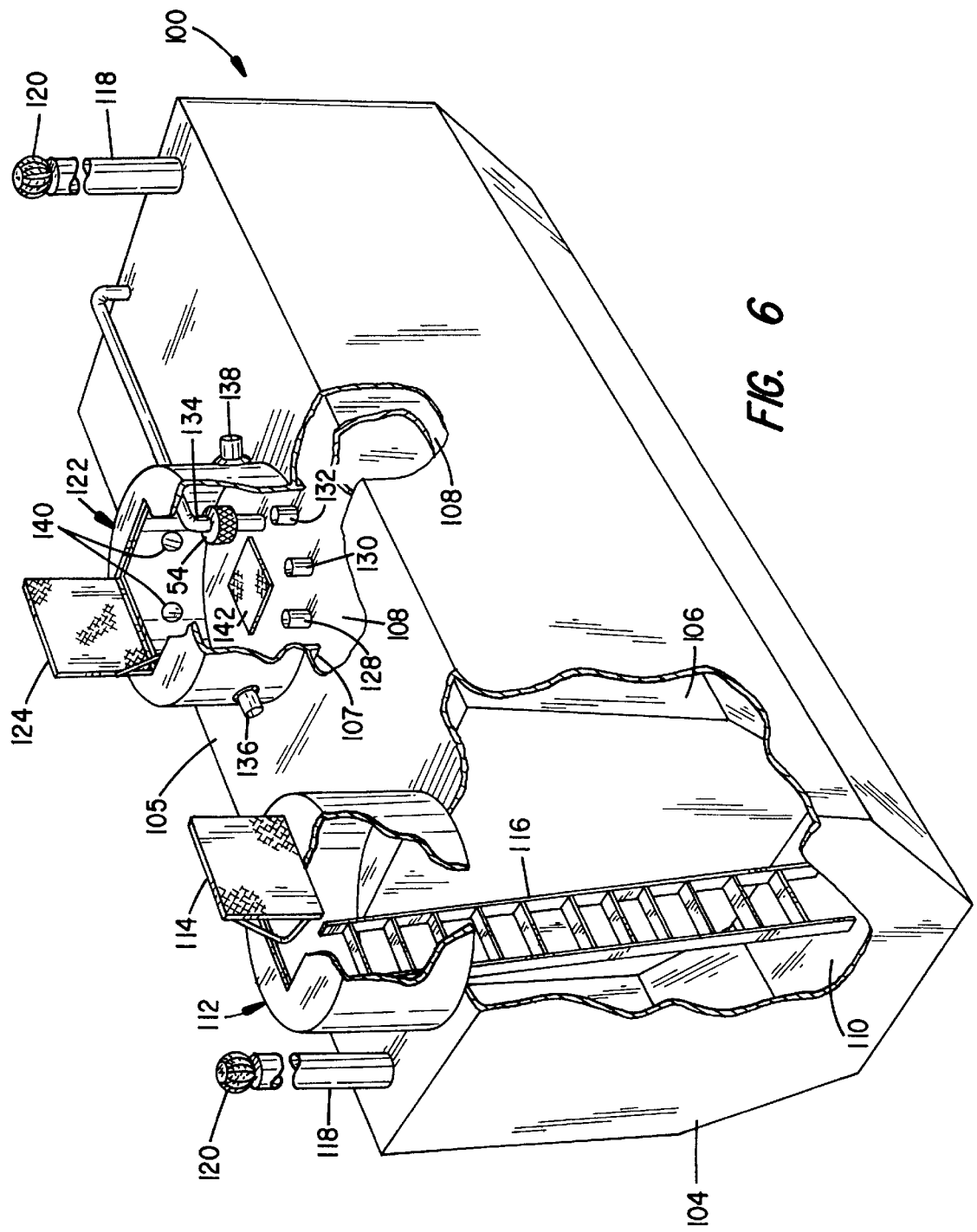
FIG. 6 is a perspective drawing to a ventilated, flat-wall, steel vault that supports a single, similarly shaped steel tank.
Figure 7:
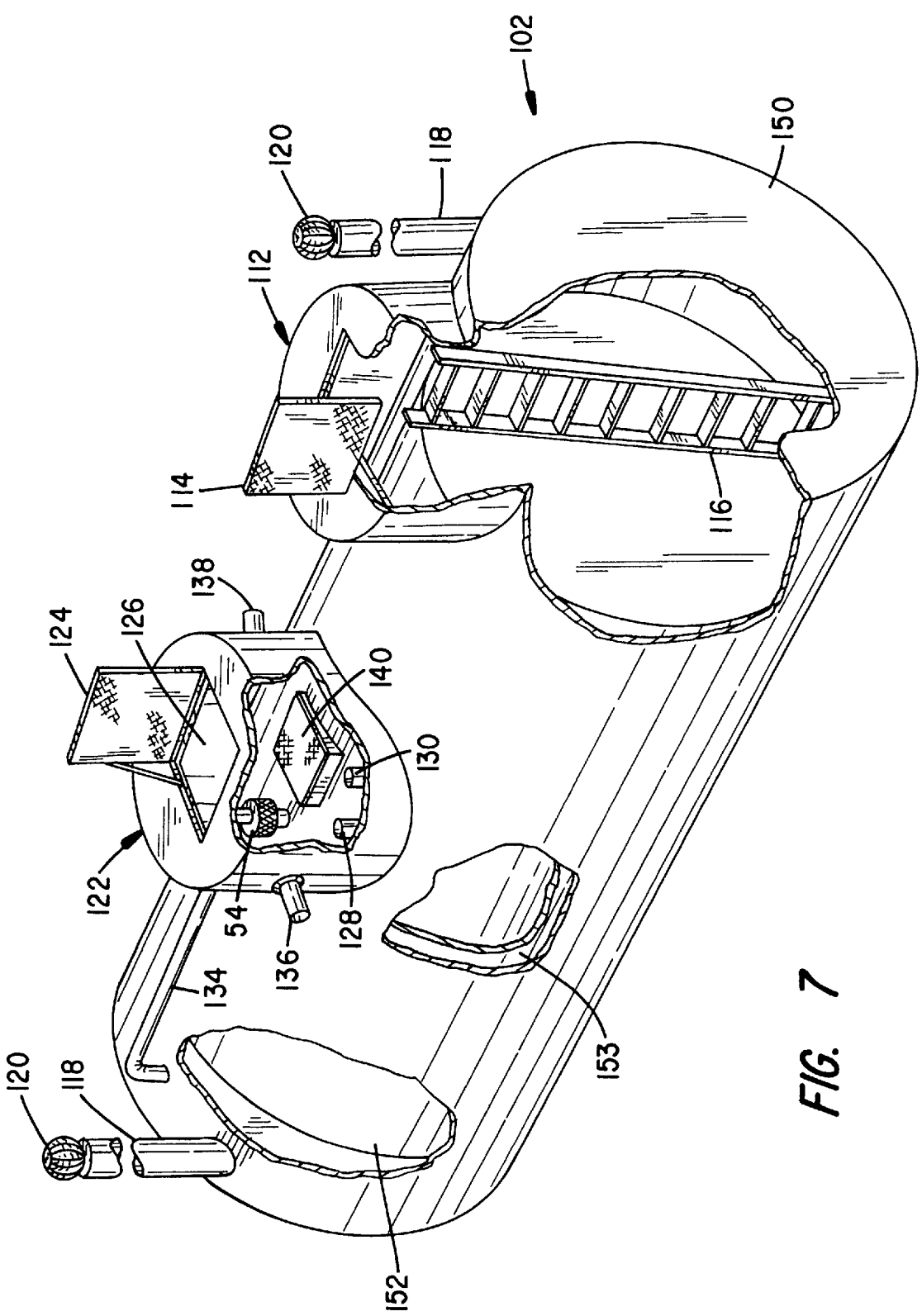
FIG. 7 is a perspective drawing to a double walled, ventilated, cylindrical steel vault that supports a single, cylindrical steel primary tank.
Figure 8:
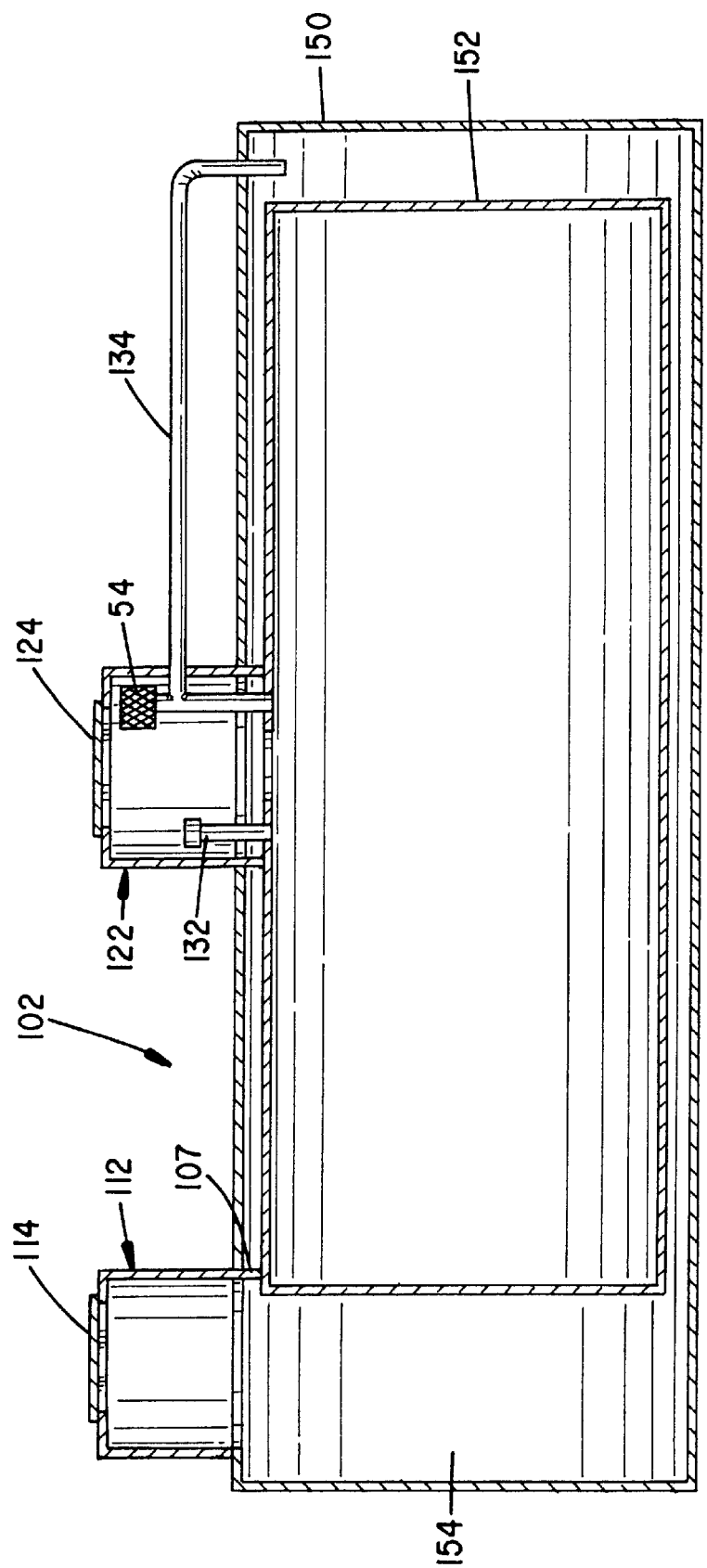
FIG. 8 is a longitudinal cross section view through the vault and primary tank of FIG. 7.
Figure 9:
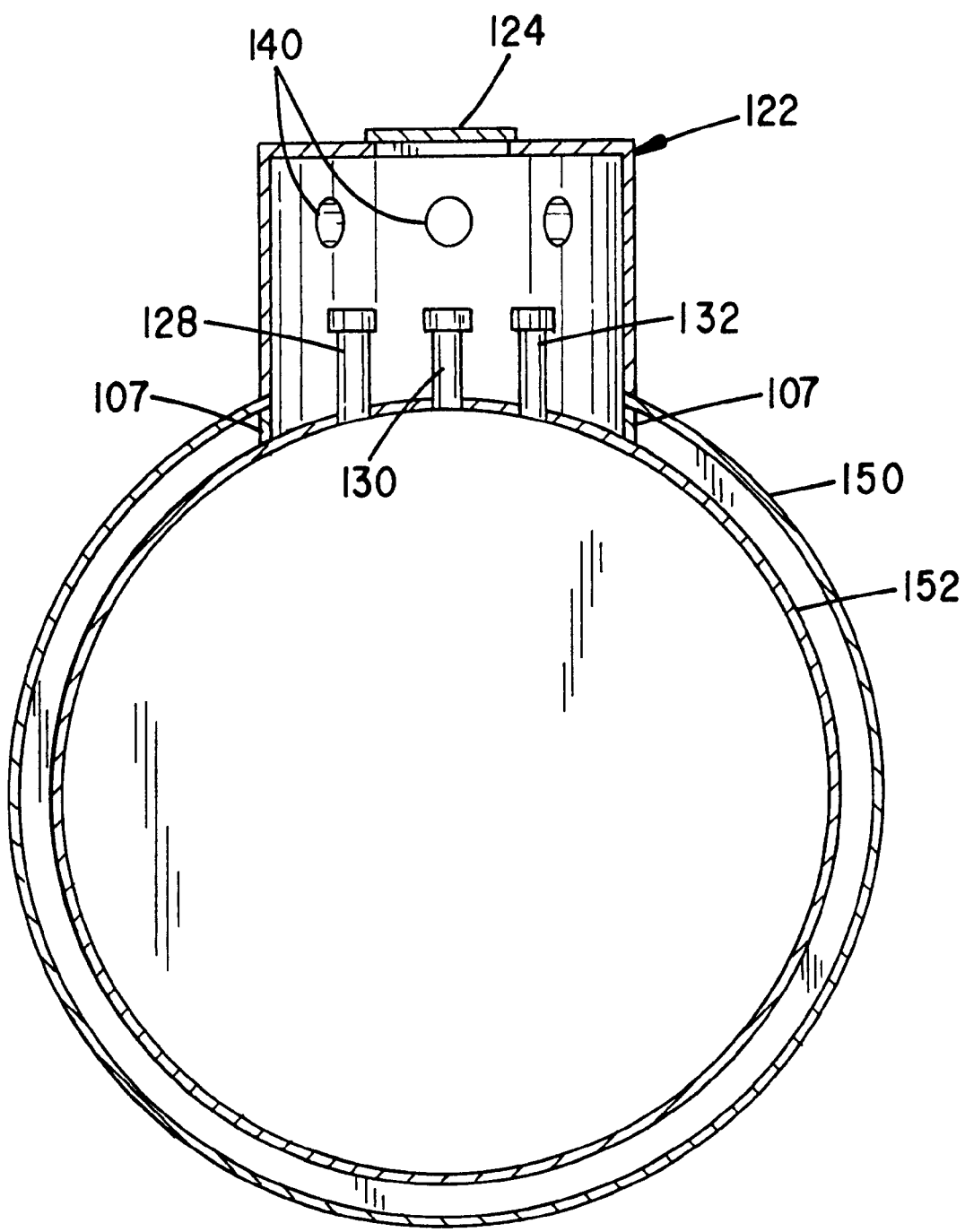
FIG. 9 is a transverse cross section view through the vault and primary tank of FIG. 7.
Figure 10:
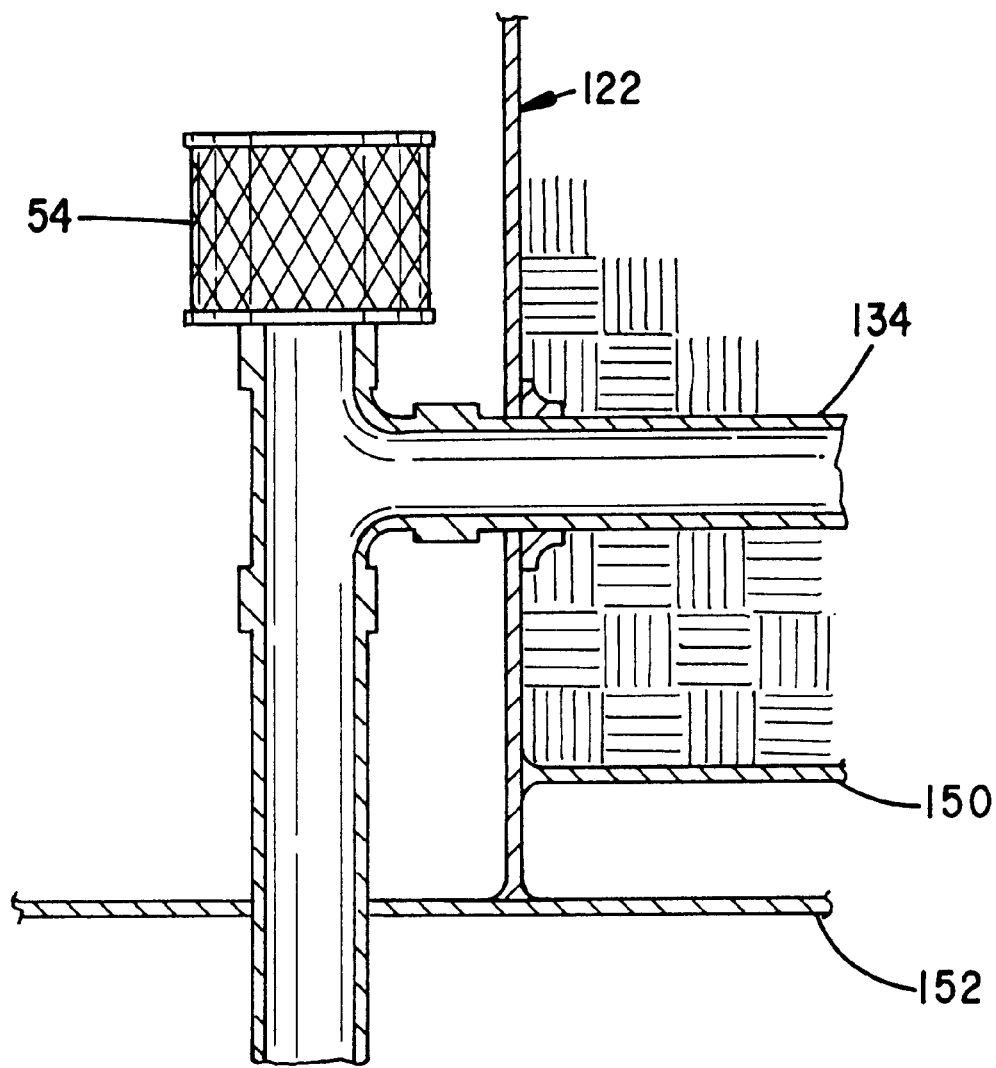
FIG. 10 is a section view to the spill vent of FIG. 7.

FIGS. 4 and 5 depict alternative, perspective and cross section views to a vault 80 that contains a single storage tank 82. The tank 82 can be sized to contain 5,000 to 10,000gallons. The vault 80 provides a cover 83 and base 84 that are sealed to one another in the fashion of FIG. 2a. The vault 80 may include an insulation liner 46 and impermeable sheathing 27, as desired. A manhole access 86 opens to a secondary space 88 in the base 84. The secondary space 88 is accessed via an associated cover 38. A ladder 40 facilitates entry and internal vault inspection. A fan 43 ventilates the space 88.

Various dispensing pipes 90 and 92 mount through a concrete hatch 96 and are accessible by via a cover 98. Separately mounted in the collar 96 is a spill containment collar 100, which has a cover 101, and fill, vent and drain collars 50, 51 and 54. An overflow pipe 94 also extends from the collar back to the tank 82.

A vent pipe 102 projects from the vault 80. A separate vent pipe 104 extends from the tank 82. The vault 80 can be used in various fuel depot situations, for example, cartage yards, resorts or industrial sites having low volume requirements. A single blend of fuel is typically required for these situations. A below-grade mount prevents ground contamination and removes the tank from exposure to above-grade hazards. The pump 8 can be remotely mounted from the vault 80 or the pump 8 and various of the control equipment and accessories discussed with respect to the vault 2 may be incorporated into the vault 80.

Appreciating the utility of the vaults 2 and 80 and possible construction from steel versus concrete, FIGS. 6 through 10 show a pair of double walled vaults 100 and 102 that are constructed from steel. With attention to FIG. 6, the vault 100 includes a steel, outer shell or container 104 that surrounds an inner tank 106. The shapes of the shell 104 and tank 106 are comparable. The tank 106 is undersized and supported with spacers 107 in the shell 104 to provide a space 108 around the tank 106. An inspection or maintenance space 110 is provided at one end of the vault 100. The spaces 108 and 110 also support the secondary containment of the stored liquids.

The spacers 107 at the top wall 105 of the vault 100 can also reinforce the top wall. Attachment plates 31 can project between the top wall 105 and tank 106 to secure the top wall to the tank 106, if the outer shell 104 and tank 106 are independently mounted to one another at the site. In the latter instance, the top wall 105 might also be welded to the sidewalls of the shell 104, alternatively banding similar to the plates 29 can secure the top wall 105 to the sidewalls of the shell 104. In short, the top wall can be either permanently bound to the shell 104 or made to be removable.

A manhole turret 112, locked cover 114, and ladder 116 provide access to the space 110. The turret 112 is welded to a top wall 105 of the shell 104. Entry to the space 110 permits maintenance personnel to view the condition of the tank 106 and perform necessary maintenance activities with respect to pump control circuitry, liquid conduits, lighting, wiring etc. that is accessible in the space 110. Vent stacks 118 and turbines 120 vent the interior of the vault 100.

A spill containment turret 122 is also welded to the wall 105. A hinged, cover 124 opens to a space 126 that supports fill, drain, vent, and overflow conduits 128, 130, 132 and 134. The conduits 128–132 communicate with the interior of the tank 106. The conduit 134 opens to the secondary space 108 and 110 and/or another auxiliary storage container mounted inside the shell 104 or displaced from the vault 100. Conduits 136 and 138 or other conduits that radiate from the turret 122 and sealed ports 140 can convey the spillage from the vault 100 or route liquids to the fill pipe 128 or necessary electrical conductors etc. to the vault 100. A cover 142 permits inspection of the tank 106.

The shell 104 and tank 106 are constructed from mild carbon, 10 gauge or better steel. The exterior of the tank 106, and interior and exterior of the shell 104 are coated with appropriate liquid impermeable sealant, corrosion and protective coatings, e.g. oxide primer. Thermal and plastic liners may also be fitted into the interior of the shell 104 in the fashion of the vault 2. The primary tank is pressure tested to hold 5 psi for 24 hours. Although the vaults of the invention are constructed with 4-hour fire ratings, a fire suppressant system may also be fitted to the interior of the vaults.

FIGS. 7 through 10 show a number of views to the double walled vault 102. The vault 102 provides a cylindrical outer shell 150 and a cylindrical inner tank 152. The tank 152 is spaced away from the shell 150 to provide a secondary containment space 153. The space 153 includes an inspection space 154 at one end of the vault 102. The space 154 is accessed from a manhole turret 112 and ladder 116. Vent pipes 118 and turbines 120 ventilate the interior of the vault 102.

A spill containment turret 122 is also welded to the top of the tank 152 and to the surrounding shell 150. A hinged, cover 124 opens to a space 126 that supports fill, drain, vent, and overflow conduits 128, 130, 132 and 134. The conduits 128–132 communicate with the interior of the tank 106. The conduit 134 opens to the secondary space 153 and/or another auxiliary storage container mounted inside the shell 150 or displaced from the vault 102. Conduits 136 and 138 or other conduits radiate from the turret 122 and sealed ports 140. A cover 142 permits inspection of the tank 106.

Although not shown, the vaults 100 and 102 also typically include sump spaces. The sump spaces are located at low points of the vault to collect spillage and permit removal. Channels may be provided to direct liquids to the sump.

While the invention has been described with respect to presently preferred constructions and various considered modifications and improvements thereto, still other constructions may be suggested to those skilled in the art. For example, the shape of the vault can be different from the primary tank. The material of the vault can be different from the primary tank. The features disclosed above can also be combined in different combinations. The invention should therefore be broadly construed within the spirit and scope of the appended claims.

What is claimed is:

1. Liquid containment apparatus comprising:
   (a) a steel vault having a plurality of walls that define an open cavity;
   (b) a primary steel tank having a primary storage space mounted in said vault and defining a secondary storage space between said vault and said primary tank and including a plurality of standpipes that project from said primary tank and communicate with the primary storage space;
   (c) a cover that mounts to said walls of said vault to cover the open cavity and including reinforcement means for maintaining the rigidity of said cover, wherein said primary tank includes attachment means for coupling to said reinforcement means, and wherein said reinforcement means and said attachment means are coupled such that said cover and primary tank are permanently bound to one another, whereby said cover and primary tank comprise a single unit;
   (d) manhole means communicating through said cover for accessing the secondary space;
   (e) means mounted to said cover to surround a fill pipe and vent pipe for capturing spillage and directing the spillage into said primary and secondary storage spaces and
   (f) means for sealing said cover to said vault.

2. Apparatus as set forth in claim 1 wherein a plurality of primary tanks are mounted in said vault and secured to said cover.

3. Apparatus as set forth in claim 1 wherein said vault includes a liquid impermeable barrier mounted between said primary tank and plurality of said walls.

4. Apparatus as set forth in claim 3 wherein the walls of said vault adjacent said primary tank are lined with a thermal insulation and wherein said plurality of walls are protected with a liquid impermeable material.

5. Apparatus as set forth in claim 1 wherein a dispensing pump is mounted to said cover and coupled to said primary tank and including control means coupled to said dispensing pump for compiling and communicating data pertaining to pumped liquids.

6. Apparatus as set forth in claim 5 including a plurality of rigid stanchions that surround said pump and wherein one of said stanchions includes means for venting said base.

7. Apparatus as set forth in claim 1 including means for ventilating the secondary storage space.

8. Liquid containment apparatus comprising:
   (a) a steel vault having a plurality of walls that define an enclosed cavity, wherein a top wall includes reinforcement means for maintaining the rigidity of said top wall;
   (b) a primary tank having a primary storage space mounted in said cavity and permanently coupled to said top wall and including a plurality of standpipes that project from and communicate with said primary storage space;
   (c) means for defining a secondary storage space between said primary tank and the walls of said vault;
   (d) manhole means communicating through said cover for accessing the secondary storage space;
   (e) means for ventilating the secondary storage space; and
   (f) means mounted to said cover to surround a fill pipe and vent pipe for capturing spillage and directing the spillage into said primary and secondary storage spaces;
   (g) a dispensing pump mounted to said cover and coupled to said primary tank and including control means coupled to said dispensing pump for compiling and communicating data pertaining to pumped liquids; and
   (f) means for sealing said cover to said vault.

* * * * *